(12) United States Patent
Gupta et al.

(10) Patent No.: US 10,469,575 B2
(45) Date of Patent: *Nov. 5, 2019

(54) TECHNIQUES FOR CONTACT EXPORTING

(71) Applicant: Facebook, Inc., Menlo Park, CA (US)

(72) Inventors: Vikas Gupta, San Mateo, CA (US);
Lior Tal, Sunnyvale, CA (US)

(73) Assignee: FACEBOOK, INC., Menlo Park, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 15/414,130

(22) Filed: Jan. 24, 2017

(65) Prior Publication Data
US 2017/0134491 A1 May 11, 2017

Related U.S. Application Data

(63) Continuation of application No. 13/752,819, filed on Jan. 29, 2013, now Pat. No. 9,591,056.

(51) Int. Cl.
*H04L 29/08* (2006.01)
*G06F 16/958* (2019.01)

(52) U.S. Cl.
CPC ........ *H04L 67/1095* (2013.01); *G06F 16/958* (2019.01); *H04L 67/02* (2013.01); *H04L 67/06* (2013.01); *H04L 67/1097* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 6,636,587 | B1 * | 10/2003 | Nagai | H04L 51/066 379/118 |
| 6,850,484 | B1 * | 2/2005 | Greenspan | H04L 29/06 370/218 |
| 7,802,191 | B2 * | 9/2010 | Pettinati | G06Q 10/10 715/738 |
| 7,849,502 | B1 * | 12/2010 | Bloch | H04L 29/12066 726/11 |
| 8,095,602 | B1 * | 1/2012 | Orbach | G06Q 10/107 709/206 |
| 8,306,922 | B1 * | 11/2012 | Kunal | G06Q 50/01 705/319 |
| 8,320,894 | B1 * | 11/2012 | Raghunath | H04M 3/42229 370/310.2 |
| 8,388,450 | B1 * | 3/2013 | McGuirk | A63F 9/24 463/42 |
| 8,521,661 | B2 * | 8/2013 | Wang | G06Q 30/02 706/12 |
| 8,671,455 | B1 * | 3/2014 | Zhu | G06F 21/554 726/26 |
| 8,758,139 | B1 * | 6/2014 | Xu | H04W 4/21 463/42 |

(Continued)

*Primary Examiner* — Backhean Tiv

(57) ABSTRACT

Techniques for contact exploring are described. An apparatus may comprise a web component and a data retrieval component. The web component may be operative to receive a remote command from a web server, and to transmit a plurality of contacts to the web serve. The data retrieval component operative to retrieve the plurality of contacts from a contacts storage on the device in response to the received remote command. Other embodiments are described.

14 Claims, 11 Drawing Sheets

(56) References Cited

U.S. PATENT DOCUMENTS

| | | | | |
|---|---|---|---|---|
| 8,798,607 B1* | 8/2014 | Kaplan | H04L 51/28 | 455/412.1 |
| 8,880,600 B2* | 11/2014 | Lento | G06Q 10/10 | 709/204 |
| 8,972,483 B2* | 3/2015 | Gregersen | H04L 29/12103 | 709/203 |
| 9,591,056 B2* | 3/2017 | Gupta | H04L 67/306 | |
| 2002/0165988 A1* | 11/2002 | Khan | H04L 41/22 | 709/246 |
| 2003/0046374 A1* | 3/2003 | Hilt | H04L 29/06 | 709/220 |
| 2004/0015811 A1* | 1/2004 | Freitas | G06F 8/20 | 717/100 |
| 2004/0028213 A1* | 2/2004 | Goss | H04L 29/06 | 379/265.09 |
| 2004/0203896 A1* | 10/2004 | Deigin | H04M 1/72572 | 455/456.1 |
| 2004/0246951 A1* | 12/2004 | Parker | H04L 29/06027 | 370/356 |
| 2005/0059418 A1* | 3/2005 | Northcutt | H04M 1/274516 | 455/517 |
| 2005/0223100 A1* | 10/2005 | Chen | G06F 16/9577 | 709/228 |
| 2006/0288077 A1* | 12/2006 | Chen | H04L 51/04 | 709/206 |
| 2007/0067392 A1* | 3/2007 | Torres | G06Q 10/10 | 709/206 |
| 2007/0136310 A1* | 6/2007 | Derrico | G06Q 10/06 | |
| 2007/0136417 A1* | 6/2007 | Kreiner | H04L 29/0899 | 709/203 |
| 2007/0143397 A1* | 6/2007 | Guedalia | H04L 29/12047 | 709/203 |
| 2007/0233736 A1* | 10/2007 | Xiong | G06Q 30/02 | |
| 2007/0266156 A1* | 11/2007 | Wilkins | G06Q 10/10 | 709/225 |
| 2008/0059605 A1* | 3/2008 | Shalev | H04L 12/2814 | 709/217 |
| 2008/0098076 A1* | 4/2008 | Lee | H04L 51/10 | 709/206 |
| 2008/0114862 A1* | 5/2008 | Moghaddam | H04L 63/0245 | 709/220 |
| 2009/0080635 A1* | 3/2009 | Altberg | G06Q 30/02 | 379/216.01 |
| 2009/0172701 A1* | 7/2009 | Gamaley | G06Q 10/10 | 719/318 |
| 2009/0204954 A1* | 8/2009 | Malmer | G06F 8/61 | 717/163 |
| 2009/0228513 A1* | 9/2009 | Tian | G06F 16/24573 | |
| 2009/0313601 A1* | 12/2009 | Baird | G06F 8/34 | 717/106 |
| 2010/0022225 A1* | 1/2010 | Benger | G06Q 10/109 | 455/414.1 |
| 2010/0183128 A1* | 7/2010 | Logan | H04M 1/6505 | 379/88.22 |
| 2010/0235749 A1* | 9/2010 | Ratnakar | G06Q 30/02 | 715/733 |
| 2010/0293476 A1* | 11/2010 | Rosenblum | H04L 12/6418 | 715/753 |
| 2010/0318544 A1* | 12/2010 | Nicolov | G06Q 30/0202 | 707/759 |
| 2010/0318611 A1* | 12/2010 | Curtin | G06F 15/16 | 709/206 |
| 2010/0318618 A1* | 12/2010 | Parker | G06F 16/972 | 709/206 |
| 2011/0055322 A1* | 3/2011 | Gregersen | H04L 29/12103 | 709/203 |
| 2011/0112976 A1* | 5/2011 | Ryan | G06Q 50/01 | 705/319 |
| 2011/0170682 A1* | 7/2011 | Kale | H04L 29/12198 | 379/218.01 |
| 2011/0191664 A1* | 8/2011 | Sheleheda | G06F 15/173 | 715/205 |
| 2011/0252091 A1* | 10/2011 | Chitturi | G06Q 10/10 | 709/204 |
| 2011/0258159 A1* | 10/2011 | Mitchell | H04M 1/274516 | 707/613 |
| 2012/0007866 A1* | 1/2012 | Tahan | G06F 19/321 | 345/428 |
| 2012/0042392 A1* | 2/2012 | Wu | H04L 63/101 | 726/28 |
| 2012/0059884 A1* | 3/2012 | Rothschild | G06F 16/954 | 709/206 |
| 2012/0059922 A1* | 3/2012 | Jason | H04L 12/14 | 709/223 |
| 2012/0096553 A1* | 4/2012 | Srivastava | G06F 21/56 | 726/24 |
| 2012/0144317 A1* | 6/2012 | Balasubramanian | H04L 67/24 | 715/751 |
| 2012/0190350 A1* | 7/2012 | Ratnakar | H04M 1/274516 | 455/414.3 |
| 2012/0203821 A1* | 8/2012 | Czajka | G06Q 10/107 | 709/203 |
| 2012/0239698 A1* | 9/2012 | Ohtake | G06F 16/25 | 707/781 |
| 2012/0240236 A1* | 9/2012 | Wyatt | G06F 21/564 | 726/25 |
| 2012/0311036 A1* | 12/2012 | Huhn | G06Q 10/10 | 709/204 |
| 2012/0323999 A1* | 12/2012 | Pearson | G06Q 10/10 | 709/204 |
| 2013/0035114 A1* | 2/2013 | Holden | H04W 4/08 | 455/456.3 |
| 2013/0044106 A1* | 2/2013 | Shuster | G06T 19/20 | 345/419 |
| 2013/0046824 A1* | 2/2013 | Park | G06Q 10/10 | 709/204 |
| 2013/0117768 A1* | 5/2013 | Gheorghe | H04L 51/28 | 719/328 |
| 2013/0143520 A1* | 6/2013 | Cai | G06Q 10/00 | 455/405 |
| 2013/0196697 A1* | 8/2013 | Lew | H04W 4/21 | 455/466 |
| 2013/0254673 A1* | 9/2013 | Lee | G06F 3/0481 | 715/739 |
| 2013/0304830 A1* | 11/2013 | Olsen | H04L 51/32 | 709/206 |
| 2013/0311568 A1* | 11/2013 | Wang | G06Q 30/02 | 709/204 |
| 2013/0311900 A1* | 11/2013 | Schleier-Smith | H04L 65/403 | 715/753 |
| 2014/0012813 A1* | 1/2014 | Oh | G06Q 10/109 | 707/635 |
| 2014/0025738 A1* | 1/2014 | Anand | H04W 4/21 | 709/204 |
| 2014/0095430 A1* | 4/2014 | Ranjan | H04L 67/306 | 707/609 |
| 2014/0200942 A1* | 7/2014 | Benjamin | G06Q 10/1093 | 705/7.18 |
| 2014/0215006 A1* | 7/2014 | Gupta | H04L 67/306 | 709/217 |
| 2014/0344215 A1* | 11/2014 | Oh | H04L 67/1095 | 707/608 |
| 2015/0249675 A1* | 9/2015 | Yeung | G06F 9/44521 | 726/22 |

* cited by examiner

600

> Transmit a web request to a web server, the web request comprising a notification to the web server that a device supports contact requests.
> 602

> Receive a remote command from the web server.
> 604

> Retrieve a plurality of contacts from a contacts storage on the device in response to the receive remote command.
> 606

> Transmit the plurality of contacts to the web server.
> 608

> Receive a social-networking friends web page from the web server, the social-networking friends web page comprising a listing of potential friends on the social-networking service identified based on the plurality of contacts.
> 610

Receive a web request from a device, the web request comprising a notification that the device supports contact requests.
702

Transmit a remote command to the device in response to the received web request.
704

Receive a plurality of contacts from the device.
706

Determine a listing of potential friends on a social-networking service identified based on the plurality of contacts.
708

Transmit a social-networking friends web page to the device, the social-networking friends web page comprising the listing of potential friends.
710

*FIG. 7*

TECHNIQUES FOR CONTACT EXPORTING

This application is a continuation of, claims the benefit of and priority to previously filed U.S. patent application Ser. No. 13/752,819 filed Jan. 29, 2013, entitled "TECHNIQUES FOR CONTACT EXPORTING," which is hereby incorporated by reference in its entirety.

BACKGROUND

Users of mobile phones often maintain a store of contacts on their device for use with the phone. Users may have use for the information stored in these contacts outside of the mobile phone. However, they may find the process of transcribing the contacts to be inconvenient, and would thus be served by a more streamlined process. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for contact exporting. Some embodiments are particularly directed to techniques to export contacts from a mobile phone to an Internet-based service. In one embodiment, for example, an apparatus may comprise a web component operative to receive a remote command from a web server, and to transmit a plurality of contacts to the web server; and a data retrieval component operative to retrieve the plurality of contacts from a contacts storage on the device in response to the received remote command. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a first logic flow for the system of FIG. 1.

FIG. 7 illustrates an embodiment of a second logic flow for the system of FIG. 1.

DETAILED DESCRIPTION

Figure 1:
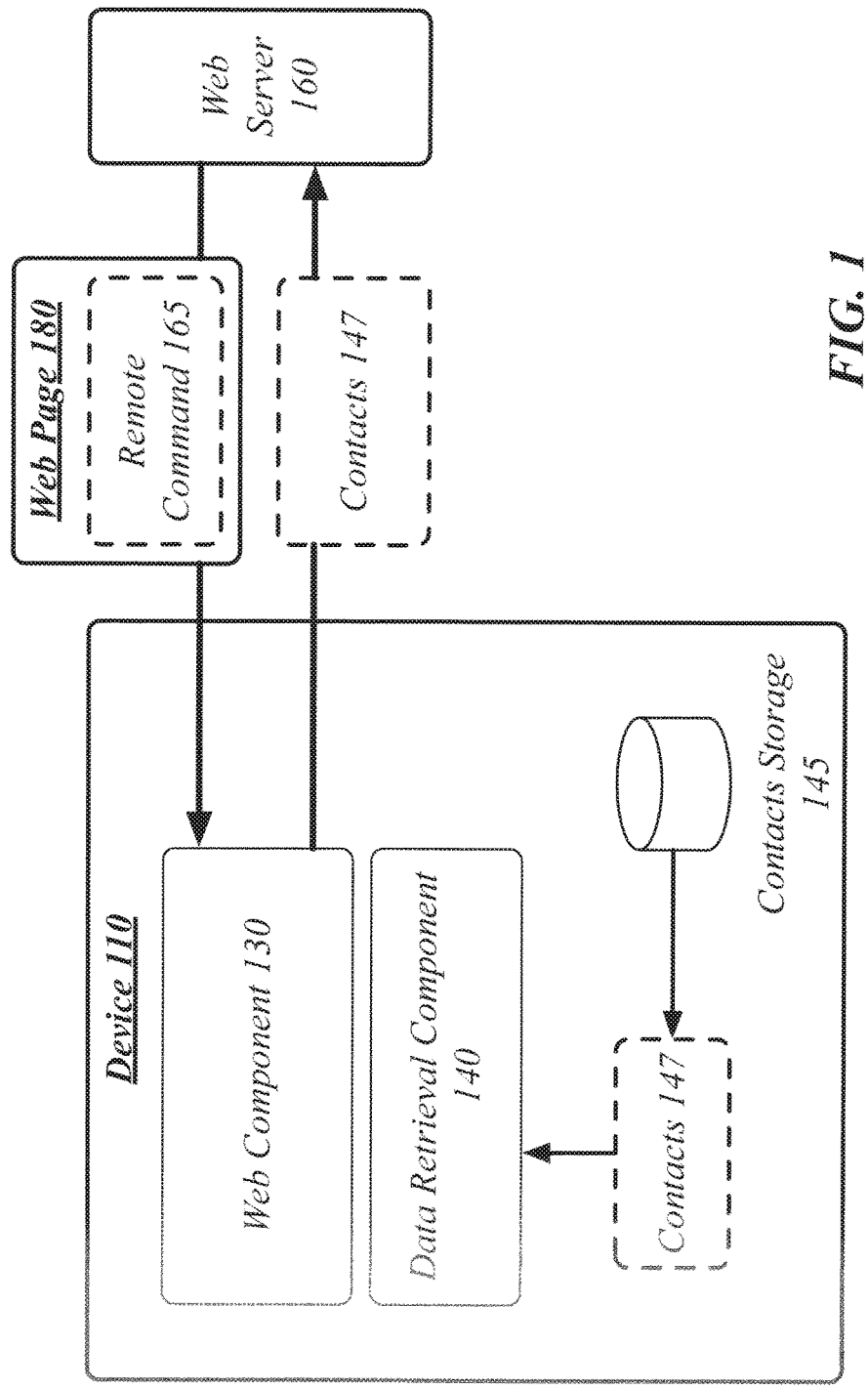
FIG. 1 illustrates an embodiment of a contact system.

Various embodiments are generally directed to techniques for leveraging a web browser to export contacts from a mobile device. Some embodiments are particularly directed to techniques for exporting contacts from a mobile device by transmitting a specialized contact-request uniform resource locator to the mobile device and receiving the contacts in response.

Mobile phone users typically maintain contacts on their device for use in making phone calls. A standard contact record may comprise a tuple consisting of a telephone number and a name, the name being any of a full name, partial name, business name, or nickname of a person or entity associate with the telephone number. These contacts may be stored in a variety of formats, but often applications on the phone will be able to retrieve contacts from a contacts storage on the phone using a standardized API that provides the applications with a list of phone numbers paired with names.

A mobile phone user may have use for these contacts outside the device. For example, a user may accumulate pairs of names and telephone numbers on their phone over time as they make friends, acquaintances, or business contacts. This makes the contacts storage on the phone a record of people that the user may know in some capacity. It may, therefore, be beneficial to the user for them to be able to leverage this information in ways other than making phone calls. For example, if the mobile phone user is a member of a social networking service then the contacts may indicate people with whom the user might to have a relationship with on the social networking service: as a friend, as an acquaintance, as a family member, as a business contact, and so forth. The user would therefore be aided by a convenient process for extracting contacts from the device and delivering them to a social networking service for use in finding new relationships on the surface.

While the contacts storage on a phone may be accessible to applications on the device using a standardized API, this API may not be useable directly from outside the phone. As a basic security measure, the internal storage and personal information of a user shouldn't be accessible from the outside. However, as long as any exportation of the contacts receives the user's permission, any loss of privacy would be voluntarily and, presumably, desired by the user in exchange for the utility provided by the service to which the contacts are being exported. As such, if an application local to the mobile phone could be used to request the user's permission and, if granted, export the contacts, the user could find new utility for their existing contacts without an unpermitted violation of their privacy.

In some cases, the social networking service may be able to have the mobile phone user install an application provided by the service on the phone. This application may provide access to the social networking service, perform functions on its behalf, and generally expand the service's utility to the user. In these cases, the application may act to retrieve contacts from the device and export them to the social networking service. However, some users may use the social networking service but decline to install an application specific to it on their phone. Instead, if they access the service using their mobile phone they may use a mobile web browser on the device. In some cases this may be a first-party application provided by a provider of the device, device operating system (OS), or cellular service. In some cases this may be a third-party application provided by another and installed on the device by the user. In either case, as a local application the web browser has access to the API for accessing contacts from the contacts storage. As such, the web browser may provide a conduit to export the contacts to the social networking service so long as the service and the browser are able to properly coordinate.

The user may therefore be aided by a local web browser on a mobile phone being operative to act on behalf of a social networking service to request a user's permission to export contacts from the device to the social networking service and to perform the extraction itself if permission is granted. As a result, the utility of the social networking service to the user may be expanded in a convenient manner that leverages existing software on the device.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a contact system 100. In one embodiment, the contact system 100 may comprise a computer-implemented contact system 100 comprising a web component 130 and data retrieval component 140. Although the contact system 100 shown in FIG. 1 has a limited number of elements in a certain topology, it may be appreciated that the contact system 100 may include more or less elements in alternate topologies as desired for a given implementation.

A device 110 may comprise a web component 130, data retrieval component 140, and contacts storage 145. The device 110 may be operative to send and exchange messages with web server 160, such as over the Internet through a Wi-Fi link, cellular data link, or any other mechanism for exchanging data.

The contacts storage 145 may comprise any method of storing contacts on a device 110. In some embodiments, this may comprise a registry, database, or other store maintained by the operating system of the device, such as on an internal store of the device 110. The contacts storage 145 may comprise cloud storage, the contacts 147 stored on one or more servers on the Internet. The contacts storage 145 may comprise a hardware contacts store, such as a dedicated module in the device 110 for storing contacts.

The web component 130 may be operative to receive a remote command 165 from a web server. The remote command 165 may comprise a request from the web server 160 to the web component 130 to initiate the retrieval of the contacts 147 from the device 110 and to transmit the contacts 147 to the web server 160.

The received remote command may comprise a contact-request uniform resource locator (URL), the data retrieval component operative to retrieve the plurality of contacts in response to the web component receiving the contact-request URL. A contact-request URL may be a URL in which all or some of the URL is a sequence of characters indicating a contact request. For example, in the URL "https://www-.facebook.com/CONTACT-REQUEST/" the string "CONTACT-REQUEST" would indicate that the web server 160 is requesting the contacts from the device 110. It will be appreciated that in some embodiments that the sequence of characters which cause the URL to be a contact-request URL may not indicate such in a human-readable form as in the example, may not be contiguous (i.e. may be spread through the URL with normal URL portions in between), and may take multiple forms such that different sequences of characters and different URLs may all comprise a contact-request URL. In general, a contact-request URL may comprise a URL encoded in such a way as to indicate to the web component 130 that the web server 160 is requesting the exporting of contacts 147. It will be appreciated that while URLs are used with the World Wide Web, that they are not limited to this example. As such, the contact-request URL may be a reference describing the location of a file, a resource, an Internet-accessible file, an Internet-accessible resource, an Internet-accessible location, a web page, or any other form of resource that may be located.

The web component 130 may be operative to have the data retrieval component 140 initiate the contact retrieval in response to a user of device 110 activating the received remote command 165. The contact-request URL may be transmitted to the web component 130 using any one of the possible means of transmitting information. For example, remote command 165 may be embedded in a web page 180 received from the web server 160. Remote command 165 may comprise a hyperlink contained in web page 180, the hyperlink comprising the contact-request URL as the destination of the hyperlink. As such, the web component 130 may be operative to receive the web page 180 and have the web page 180 displayed for the user of the device 110, such as by a display component of device 110. The web component 130 may be operative to determine that the user of the device 110 has selected the hyperlink in web page 180 and to inform the data retrieval component 140 to initiate the retrieval of contacts 147 as a result. As such, while the hyperlink may correspond to the received remote command 165, the remote command 165 may not be initiated until a device user selects the hyperlink.

The web component 130 may confirm with a user of the device 110 that they grant permission to export the contacts 147 before having the data retrieval component 140 initiate the procedure. In some cases, this may comprise the web component 130 requesting permission from the user in direct response to receiving the remote command 165. In other cases, this may comprise the web component 130 requesting permission from the user in response to the user activating the remote command 165, such as by selecting a hyperlink in the web page 180 comprising a contact-request URL.

Requesting the user's permission may comprise the web component 130 instructing a display component to display a dialog to a user of the device 110, the dialog comprising a message explaining the permission being requested and two or more user controls allowing the user to either grant or deny permission. The web component 130 may be operative to instruct the data retrieval component 140 to initiate contact retrieval in response to the user granting permission. In some cases, an operating system of the device 110 may automatically require the user to grant permission for an application to access contacts storage 145. As such, the web component 130 may initiate the contact retrieval by the data retrieval component 140 and assume that the operating system will handle getting the user's permission.

The data retrieval component 140 may be operative to retrieve the plurality of contacts 147 from a contacts storage 145 on the device 110 in response to the received remote command 165. The contacts storage 145 may comprise a contacts application, contracts address book, contacts database, contacts registry, hardware-based contacts store, or any other store of contacts. Retrieving the plurality of contacts 147 from contacts storage 145 may comprise the data retrieval component 140 accessing a file on device 110, using an API on device 110, or using any other technique for accessing a store.

The data retrieval component 140 may be operative to reformat the contacts 147 to a format suitable for the web component 130. For instance, the data retrieval component may be operative to retrieve contacts 147 stored in a variety of formats and transform them to a standardized format used by the web component 130.

In some embodiments, each of the plurality of contacts 147 retrieved from the contacts storage 145 may comprise one or more phone numbers. The plurality of contacts 147 may comprise tuples consisting of a name and a phone number. The plurality of contacts 147 may comprise bundles of contact information wherein each bundle contain a name, a phone number, and additional data.

The web component 130 may be operative to transmit the plurality of contacts 147 to the web server 160. The transmission of the contacts 147 to the web server 160 may comprise the web component 130 sending a file containing the contact 147 to the web server 160 using an Internet-based protocol. In some embodiments, the transmission of the contacts 147 to the web server 160 may comprise the web component 130 sending an Hypertext Markup Language (HTML) message to the web server 160 using the Hypertext Transfer Protocol (HTTP) or Hypertext Transfer Protocol Secure (HTTPS). The web component 130 may be operative to send a request message to the web server 160 with the "POST" command, the contacts 147 contained within a message body of the request message. In some cases, the web component 130, the web server 160, the device 110, or some part of the transmission path may limit the size of a request message transmitted from the web component 130 to the web server 160. In these cases, the web component 130 may be operative to perform multiple "POST" requests, the contacts 147 divided between the requests so as to fit within the size limit. In some embodiments, the web component 130 may be operative to encrypt the contacts 147 before transmitting them to the web server 160, the web server 160 operative to decrypt the contacts 147 after receiving them. The web component 130 and the web server 160 may be operative to negotiate an encryption protocol, encryption options, and one or more encryption keys for the encrypted transmission of the contacts 147. The web component 130 and the web server 160 may be operative to use an encrypted HTTP protocol, such as the HTTPS or Secure Hypertext Transport Protocol (S-HTTP) protocols, for the encrypted transmission of the contacts 147.

Figure 2:
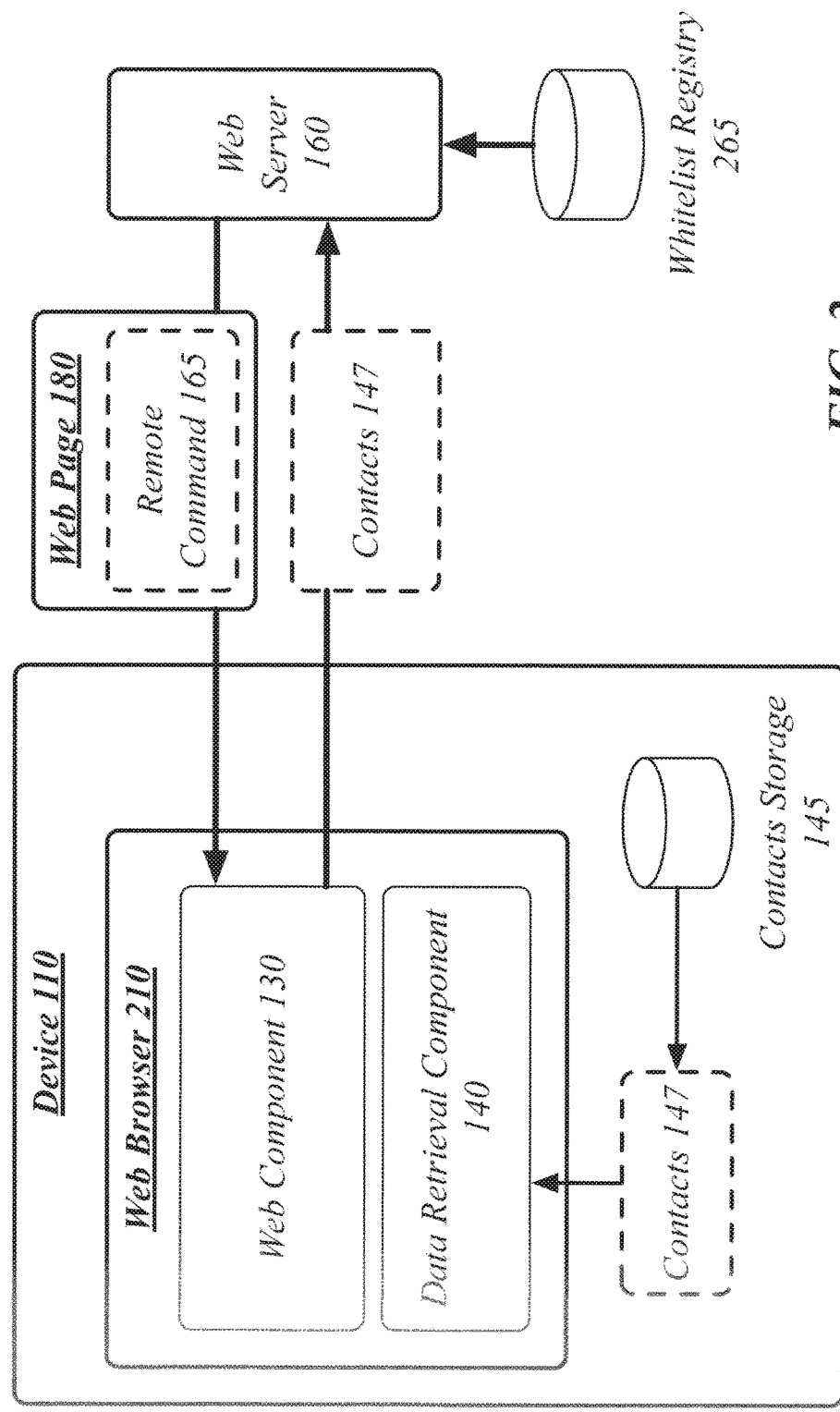
FIG. 2 illustrates a second embodiment of a contact system including a web browser.

FIG. 2 illustrates a second embodiment of a contact system 100 including a web browser 210.

The contact system 100 may comprise a web browser 210 comprising the web component 130 and data retrieval component 140, the web browser 210 whitelisted by the web server 160 as authorized to handle contact requests. The web browser 210 may comprise a first-party web browser 210 provided by the manufacturer or provider of device 110, the manufacturer or provider of an operating system of device 110, or the provider of cellular service to device 110. The web browser 210 may comprise a third-party web browser 210 provided by an entity other than the manufacturer or provider of device 110, the manufacturer or provider of an operating system of device 110, or the provider of cellular service to device 110. The web browser 210 may comprise a third-party web browser 210 provided by the same entity as administers the web server 160. The web browser 210 may comprise an application provided with device 110 or installed by a user of device 110.

The web server 160 may maintain or have access to a whitelist registry 265 containing a listing of web browsers authorized to handle contact requests. The whitelist registry 265 may be maintained by the operator of web server 160 or by a separate entity. The whitelist registry 265 may comprise a list, database, or other store of identifiers for web browsers, wherein a web browser 210 appears in the store if the web browser 210 is authorized to handle contact requests. A web browser 210 being authorized to handle contact requests may comprise the maintainer of whitelist registry 265 having registered, confirmed, tested, or otherwise learned that the web browser 210 is operative to receive a remote command 165 and respond with contacts 147. A web browser 210 being authorized to handle contact requests may comprise the maintainer of whitelist registry 265 having registered, confirmed, tested, or otherwise learned that the web browser 210 can be trusted to handle a user's contacts 147.

Figure 3:
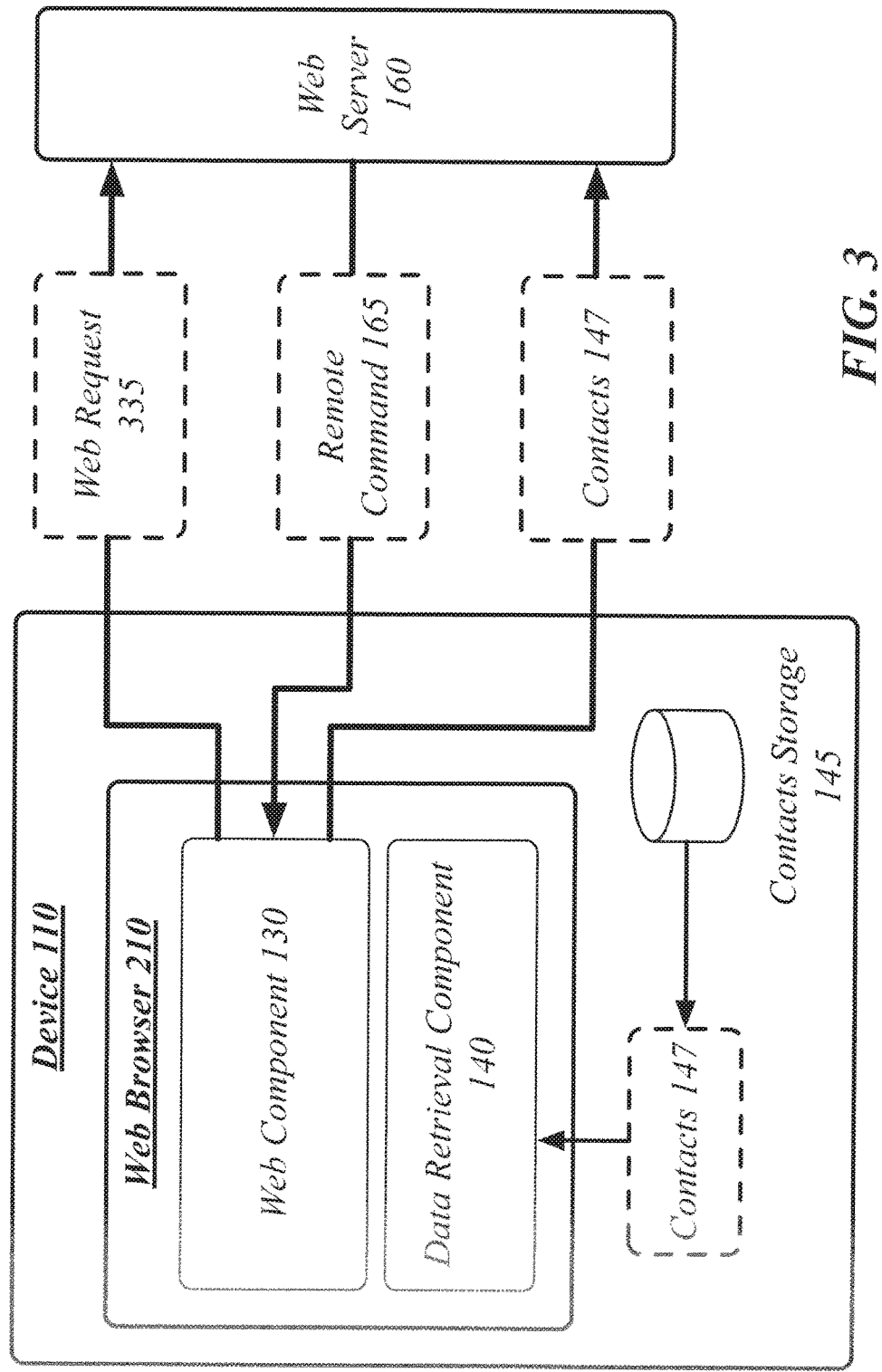
FIG. 3 illustrates a third embodiment of a contact system including a web request to the web server.

FIG. 3 illustrates a third embodiment of a contact system 100 including a web request 335 to the web server 160.

The web component 130 may be operative to transmit a web request 335 to the web server 160, the web request 335 comprising a notification to the web server 160 that the web component 130 supports contact requests. The web component 130 may be operative to include the notification with all web requests that are sent to all web browsers, or may be operative to only include the notification in web requests sent to web browsers registered with the browser as supporting or being authorized to make contact requests.

The web request 335 may comprise an HTTP "GET" request for a URL hosted by web server 160. The web component 130 may be operative to include the notification in the header of the "GET" request sent to the web server 160. Where the remote command 165 is included as part of a web page transmitted from the web server 160 to the web component 130, the web server may be operative to transmit the web page in response to the "GET" request which comprises the notification.

The web component 130 may be operative to transmit a web request 335 to the web server 160, the web request 335 comprising an identifier for web component 130 or web browser 210. The identifier may be used by the web server 160 to confirm that the web component 130 supports contact requests, such as by comparing the identifier to a registry of web components or web browsers that support contact requests. Similarly, the identifier may be used by the web server 160 with the whitelist registry 265 to confirm that the web browser 210 is authorized to handle contact requests.

In some cases, an identifier for web component 130 may be used where web component 130 is provided by a library and used by web browser 210. For example, web browser 210 may comprise an application including web functionality, the web functionality provided by using the library. As such, the web component 130 provided by the library may be operative to receive and respond to remote command 165 without the knowledge of web browser 210 or specific support by the provider of web browser 210.

Figure 4:
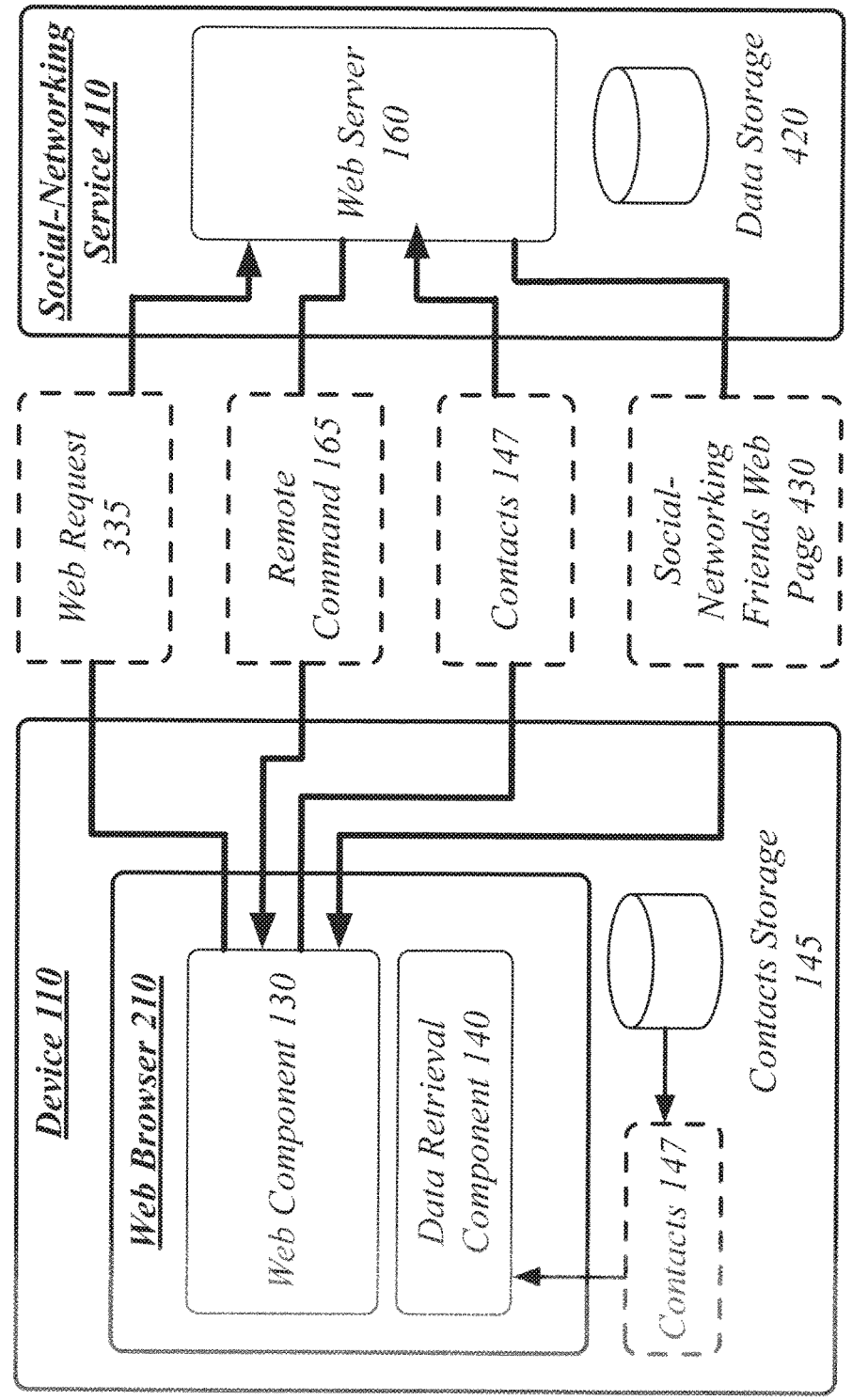
FIG. 4 illustrates a fourth embodiment of a contact system including a social-networking service.

FIG. 4 illustrates a fourth embodiment of a contact system 100 in which the web browser 210 is interacting with a social-networking service 410.

In some embodiments, the web server 160 may be part of a social-networking service 410, the web component 130 operative to receive a social-networking friends web page 430 from the web server 160, the social-networking friends web page 430 comprising a listing of potential friends on the social-networking service 410 identified based on the plurality of contacts 147.

The web request 335 may comprise a request from the web component 130 to the web server 160 for a social-networking web page as part of the social-networking service 410. The web server 160 may be operative to receive the web request 335 and to respond by transmitting the social-networking web page, the social-networking web page comprising the remote command 165. The remote command 165 may comprise a hyperlink included as part of the social-networking web page, the hyperlink including a text, image, or other indicator that by selecting the hyperlink a user of device 110 can initiate exporting contacts to the social-networking service 410 such as for finding possible relationships on the social-networking service 410.

The web component 130 may be operative to receive the social-networking web page including the remote command 165 and to display the web page or have the web page displayed for a user of device 110. The display of the web page may include displaying the text, image, or other indicator associated with a hyperlink for the remote command 165. The web component 130 may be operative to receive a command from the user to follow the hyperlink and to detect that the hyperlink is for a contacts-request URL. The web component 130 may be operative to initiative the data retrieval component 140 retrieving the contacts 147 from contacts storage 145, to receive the contacts 147 from the data retrieval component 140, and to transmit the contacts 147 to the web server 160.

The web server 160 may be operative to receive the contacts 147 and to have them compared to a data storage 420 for the social-networking service 410. The data storage 420 may comprise information for members of the social-networking service 410, such as names, phone numbers, other contact information, and any information which may be matched to contacts 147. The web server 160 may be operative to perform the comparison itself or to send the contacts 147 to another element of the social-networking service 410.

The contacts 147 may be compared to the member information from the data storage 420 to determine a listing of potential friends for the user of device 110. Friends may refer to any connection on the social-networking service based on the contacts, such as a social relationship, a business relationship, a familiar relationship, or any other relationship. A potential friend may be any member of the social-networking service 410 with a profile or other information associated with the member which matches some element of contacts 147. The web server 160 may be operative to determine the listing of potential friends on the social-networking service 410 based on the plurality of contacts 147. The web server 160 may be operative to receive the listing of potential friends from the social-networking service 410 or from another element of the social-networking service 410.

The web server 160 may be operative to construct a social-networking friends web page 430 from the listing of potential friends, the social-networking friends web page 430 comprising the listing of potential friends. The web server 160 may be operative to transmit the social-networking friends web page 430 to the web component 130 for display to the user. The social-networking friends web page 430 may include a control, such as a hyperlink, associated with each potential friend in the listing of potential friends included in the social-networking friends web page 430, the control empowering the user of the device 110 to add the associated potential friend as a friend on the social-networking service 410. The social-networking friends web page 430 transmitted to the web component 130 may comprise only a portion of the listing of potential friends, the listing divided between a plurality of pages, wherein each page contains hyperlinks to one or more of the rest of plurality of pages.

The web component 130 may be operative to receive the social-networking friends web page 430. The web component 130 may be operative to display or have displayed the social-networking friends web page 430. The web component 130 may be operative to receive user selections of potential friends on the social-networking friends web page 430 and to transmit the selections to the web server 160 to instantiate a relationship on the social-networking service 410. The web server 160 may be operative to receive the selections and to associate the user of device 110 with the selected potential friend(s) on the social-networking service 410 or to send requests to the potential friends on the social-networking service 410 on behalf of the user of device 110 to instantiate a relationship.

Figure 5:
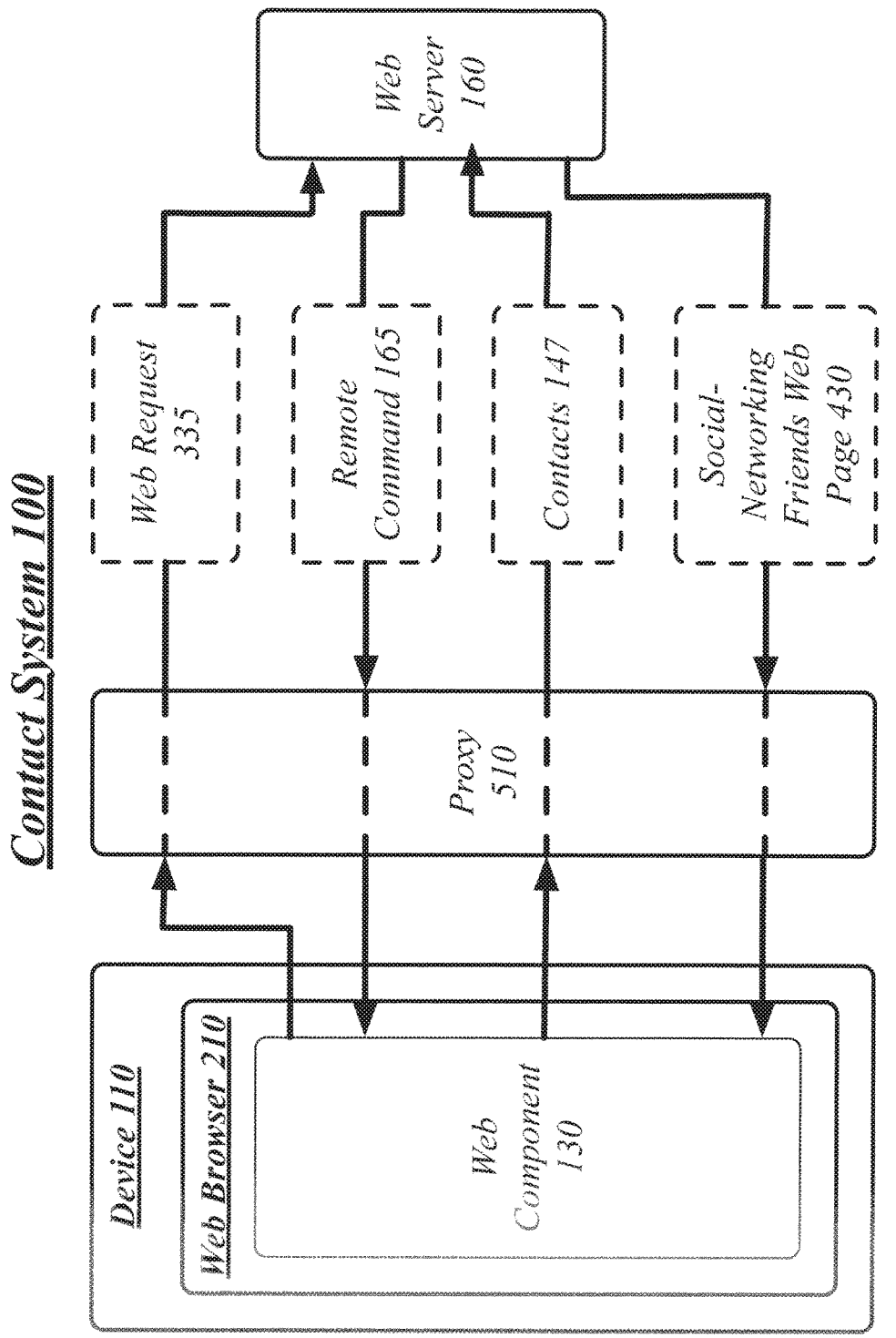
FIG. 5 illustrates a fifth embodiment of a contact system in which the web browser is communicating with the web server through a proxy.

FIG. 5 illustrates a fifth embodiment of a contact system 100 in which the web browser 210 is communicating with the web server 160 through a proxy 510.

The web component 130 may communicate with the web server 160 through a proxy 510. The proxy 510 may comprise a proxy 510 that bridges between networks or otherwise aids in the transmission of messages between devices. The proxy 510 may comprise a web-assist proxy 510 that modifies messages, such as HTML messages, sent between devices in order to aid a client device, such as device 110, in rendering or displaying web pages. For example, the device 110 may have limited processing resources such that the web component 130 is at risk of taking longer to process web pages to display than would be convenient for a user of device 110. As such, the proxy 510 may be operative to perform pre-processing on web pages transmitted to the device 110 in order to reduce the processing time web component 130 will use to display the web pages for a user.

As such, the web component 130 may be operative to transmit the web request 335 to the web server 160 through the proxy 510, the web server 160 operative to receive the web request 335 from the web component 130 through the proxy 510. The web server 160 may be operative to send the remove command 165—such as inside a web page—to web component 130 through proxy 510, the web component 130 operative to receive the remote command 165 through the proxy 510. The web component 130 may be operative to transmit the plurality of contacts 147 to the web server 160 via the proxy 510, the web server 160 operative to receive the contacts 147 from the web component 130 through the proxy 150. The web server 160 may be operative to transmit the social-networking friends web page 430 to the web component 130 through the proxy 510, the web component 130 operative to receive the social-networking friends web page 430 from the web server 160 through the proxy 150.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates an embodiment of a first logic flow 600 for the system of FIG. 1. The logic flow 600 may be representative of some or all of the operations executed by one or more embodiments described herein.

In the illustrated embodiment shown in FIG. 6, the logic flow 600 may be operative at block 602 to transmit a web request 335 to the web server 160, the web request 335 comprising a notification to the web server 160 that a device 110 supports contact requests. The web request 335 may be transmitted in response to a user of device 110 selecting a bookmark, hyperlink, or other control leading to the social-networking service 410. The transmitted web request 335 may comprise a web browser identifier, the web browser identifier corresponding to a whitelist of web browsers authorized to handle contact requests.

The logic flow 600 may be operative at block 604 to receive a remote command 165 from the web server 160. The remote command 165 may be received a component of a web page, such as a hyperlink within a web page. The remote command 165 may comprise a contact-request URL, the contact-request URL containing one or more strings of characters identifying the URL as a contact-request URL.

The logic flow 600 may be operative at block 606 to retrieve a plurality of contacts 147 from a contacts storage 145 on a device 110 in response to the received remote command 165. Retrieving the plurality of contacts 147 may comprise using an API, opening a file, or any other technique for retrieving data from a device 110.

Where the remote command 165 comprises a contact-request URL, the logic flow 600 may retrieve the plurality of contacts 147 in response to receiving the contact-request URL. Receiving the contact-request URL may comprise the URL being received as part of a web page 180 or may comprise the URL being selected by a user of device 110. In some embodiments, the contact-request URL may be considered as received when a web component 130 or web browser 210 attempts to load the contact-request URL as its current location, whether that attempt to load is initiated by a user selecting the contact-request URL in a web page 210, by a user opening a bookmark comprising the contact-request URL, or any other mechanism by which the web component 130 or web browser 210 would load the contact-request URL.

The logic flow 600 may be operative at block 608 to transmit the plurality of contacts 147 to the web server 160. Transmitting the plurality of contacts 147 may involve translating the contacts 147 from a native format used for contacts storage 145 into a format appropriate for transmission to the web server 160. The contacts 147 may be translated into tuples of names and phone numbers, the names and phone numbers listed in the body of an HTML message sent as a "POST" request to the web server 160. In some cases, the contacts 147 may be transmitted via a proxy 510, wherein the proxy receives the transmission and forwards it to the web server 160.

The logic flow 600 may be operative at block 610 to receive a social-networking web page 430 from the web server 160, the social-networking friends web page 430 comprising a listing of potential friends on the social-networking service 410 identified based on the plurality of contacts 147. The social-networking web page 430 may be displayed to a user, the user empowered to select potential friends on the displayed social-networking web page 430 for addition to a social-networking friends group.

The embodiments are not limited to this example.

FIG. 7 illustrates an embodiment of a second logic flow for the system of FIG. 1. The logic flow 700 may be representative of some or all of the operations executed by one or more embodiments described herein.

In the illustrated embodiment shown in FIG. 7, the logic flow 700 may be operative at block 702 to receive a web request 335 from a device 110, the web request 110 comprising a notification that the device 110 supports contact requests. The web request may comprise an HTTP "GET" command, the notification comprising a symbol, signifier, text string, or any other indicator in a message body or message head of the "GET" command.

The received web request 335 may comprise a web browser identifier, the web browser identifier corresponding to a whitelist of web browsers authorized to handle contact requests. The logic flow 700 may compare the identifier to a whitelist registry 265 of whitelisted web browser in order to determine whether the web browser that transmitted the web request 335 is authorized.

The logic flow 700 may be operative at block 704 to transmit a remote command 165 to the device 110 in response to the received web request 335. The remote command 165 may comprise a contact-request URL. The contact-request URL may be transmitted to the device 110 embodied in a web page. The contact-request URL may be associated with text, such as the visible text associated with a hyperlink, indicating that the hyperlink allows a user to upload contacts in order to find friends, the redirect portion of the hyperlink the contact-request URL.

The logic flow 700 may be operative at block 706 to receive a plurality of contacts 147 from the device 110. The plurality of contacts 147 may be received in the form of a HTTP "POST" request transmitted by the device 110, the request including the plurality of contacts 147 in the HTML message body of the request.

In some embodiments, the plurality of contacts 147 may be received via a proxy 510. In some embodiments, the proxy 510 may comprise a general web proxy 510 generally capable of transmitting HTML message between a web browser 210 and a web server 160. In some embodiments, the proxy 510 may comprise a contacts-request-enabled web proxy 510 specifically set up to assist in contact requests, the contacts-request-enabled web proxy 510 operative to ensure that a transmitted contact-request URL and that transmitted contacts 147 are not disrupted by any modification, translation, or other changes carried out by the contacts-request-enabled web proxy 510.

The logic flow 700 may be operative at block 708 to determine a listing of potential friends on a social-networking service 410 identified based on the plurality of contacts 147. Each of the plurality of contacts 147 may comprise one or more phone numbers, which may be associated with one or more names. The logic flow 700 may be operative to use the phone numbers and/or names and/or other information from the contacts 147 to determine the listing of potential friends. The listing of potential friends may be a listing determined to be possible relevant to a user of the device 110 based on the contacts 147 received from the device.

The logic flow 700 may be operative at block 710 to transmit a social-networking friends web page 430 to the device, the social-networking friends web page 430 comprising the listing of potential friends. The social-networking friends web page 430 may include one or more hyperlinks, controls, or other elements enabling a user of device 110 to select one or more of the listing of potential friends for addition to their social circle, friends list, or other record of relationships on the social-networking service 410.

The embodiments are not limited to this example.

Figure 8:
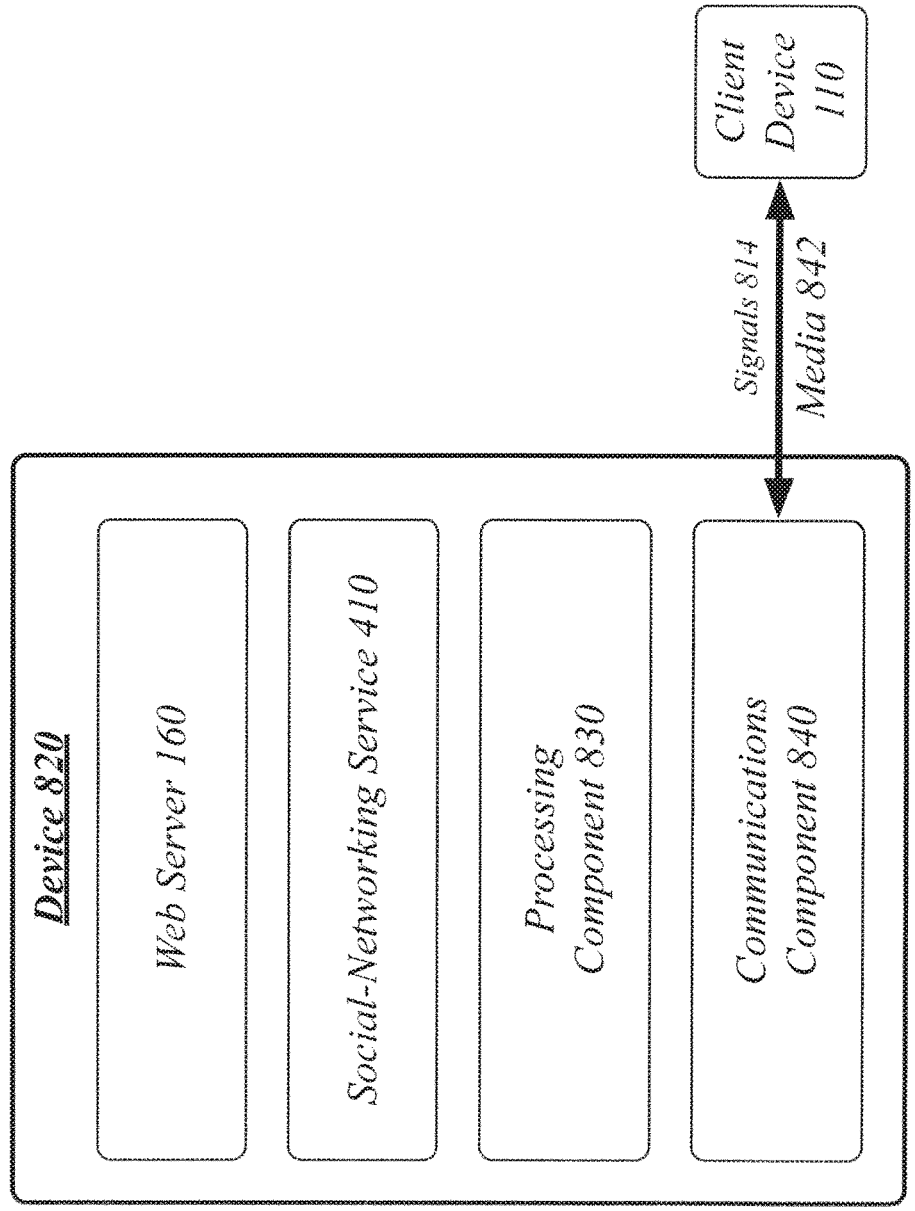
FIG. 8 illustrates an embodiment of a centralized system for the system of FIG. 1.

FIG. 8 illustrates a block diagram of a centralized system 800. The centralized system 800 may implement some or all of the structure and/or operations for the contact system 100 in a single computing entity, such as entirely within a single device 820.

The device 820 may comprise any electronic device capable of receiving, processing, and sending information for the contact system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the contact system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the contact system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with client device 110 over a communications media 842 using communications signals 814 via the communications component 840. The device 820 may be operative to implement both web server 160 and social-networking service 410 as part of contact system 100. The web server 160 may be operative to perform web hosting for the social-networking service 410 on the device. The signals 814 sent over media 842 may comprise the transmission of a web request 335 from the client device 110 to the web server 160, a transmission of a remote command 165 from the web server 160 to the client device 110, a transmission of a plurality of contacts 147 from the client device 110 to the web server 160, and the transmission of a social-networking friends web page 430 from the web server 160 to the client device 110.

Figure 9:
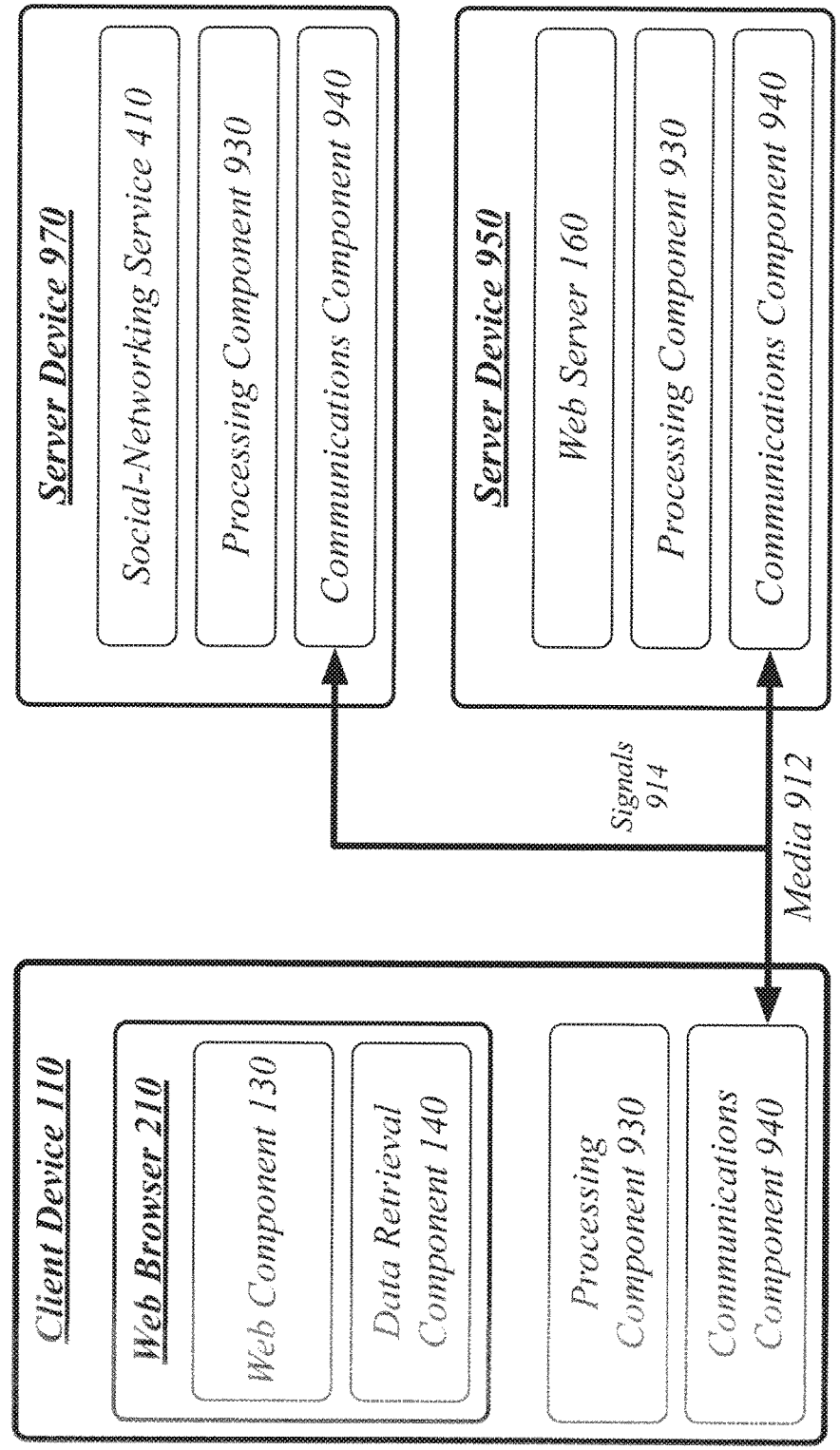
FIG. 9 illustrates an embodiment of a distributed system for the system of FIG. 1.

FIG. 9 illustrates a block diagram of a distributed system 900. The distributed system 900 may distribute portions of the structure and/or operations for the contact system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 110 and server device 950, 970. In general, the client device 110 and the server devices 950, 970 may be the same or similar to the client device 820 as described with reference to FIG. 8. For instance, the client system 110 and the server systems 950, 970 may each comprise a processing component 930 and a communications component 940 which are the same or similar to the processing component 830 and the communications component 840, respectively, as described with reference to FIG. 8. In another example, the devices 110, 950, and 970 may communicate over a communications media 912 using communications signals 914 via the communications components 940.

The client device 110 may comprise or employ one or more client programs that operate to perform various methodologies in accordance with the described embodiments. In one embodiment, for example, the client device 910 may implement the web browser 210, the web browser 210 comprising the web component 130 and the data retrieval component 140.

The server devices 950, 970 may comprise or employ one or more server programs that operate to perform various methodologies in accordance with the described embodiments. In one embodiment, for example, the server device 950 may implement the web server 160. In one embodiment, for example, the server device 970 may implement the social-networking service 410. In some embodiments, the server device 950 may comprise one of a plurality of server devices providing web serving for the social-networking service 410. In some embodiments, the server device 970 may comprise a plurality of distributed server devices hosting social-networking service 410. The one or more server devices providing web serving for the social-networking service 410 may comprise part of the social-networking service 410 or may comprise a separate entity, such as a web-hosting entity or company, associated with, working with, hired by, or otherwise providing hosting for the social-networking service 410.

The signals 914 sent over media 912 may comprise communication between the web component 130, web server 160, and social-networking service 410. The signals 914 may comprise the transmission of a web request 335 from the web component 130 to the web server 160, a transmission of a remote command 165 from the web server 160 to the web component 130, a transmission of a plurality of contacts 147 from the web component 130 to the web server 160, and the transmission of a social-networking friends web page 430 from the web server 160 to the web component 130. The signals 914 sent over media 912 may comprise a request from the web server 160 to the social-networking service 410 to retrieve a listing of potential friends based on a plurality of contacts 147, the request including the plurality of contacts 147. The signals 914 sent over media 912 may comprise a response from the social-networking service 410 to the web server 160 in response to the request, the response comprising a listing of potential friends on the social-networking service 410.

Figure 10:
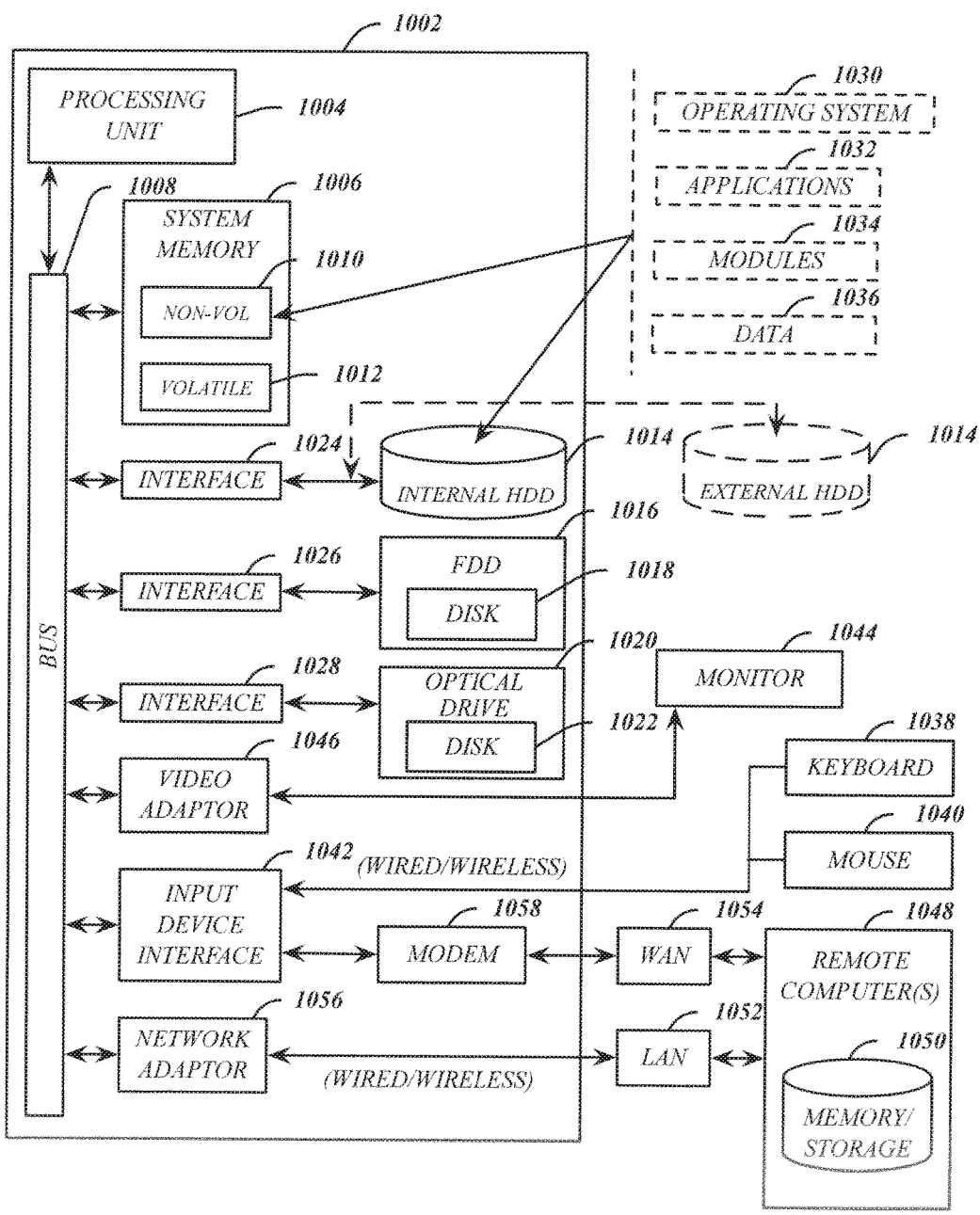
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8 and FIG. 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the contact system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
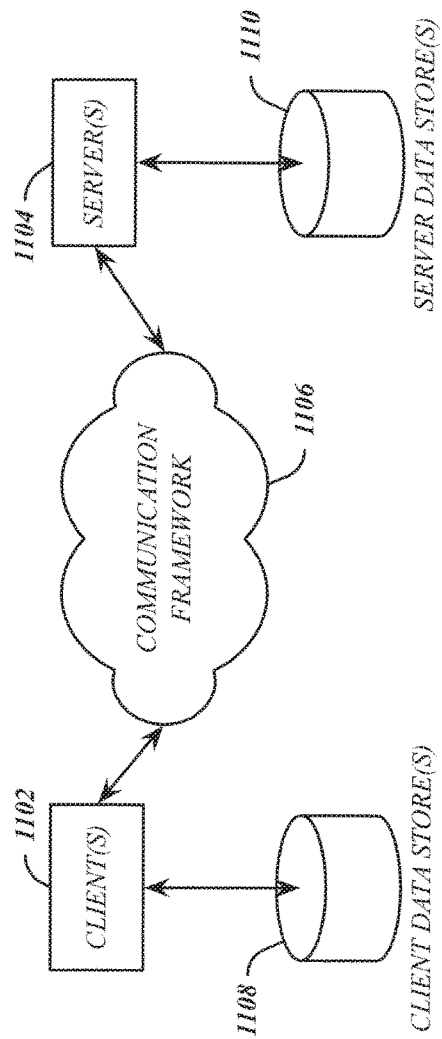
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 110. The servers 1104 may implement the server devices 810, 950, and 970. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
 a processor circuit on a device;

a web browser operative on the processor circuit;

a web component operative on the processor circuit to transmit a web request to a web server, the web request comprising a notification to the web server that the web component supports contact requests, to receive a remote command indicating a contacts request from the web server, and to transmit a plurality of contacts to the web server, the web component operative to receive and respond to the remote command without specific support provided by the web browser, and the remote command comprising a contact-request uniform resource locator (URL) including a sequence of one or more characters indicating a contact request; and a data retrieval component operative on the processor circuit to retrieve the plurality of contacts from a contacts storage on the device in response to the received remote command, the plurality of contacts to be retrieved through an application program interface (API) call performed by an application local to the contacts storage, the API invoked in response to receiving the contact-request URL from the web server.

2. The apparatus of claim 1, wherein the web browser comprises an application including web functionality provided by a library, the library also providing the web component.

3. The apparatus of claim 1, the web browser whitelisted by the web server as authorized to handle contact requests.

4. The apparatus of claim 1, the web component operative to receive a web page from the web server, the web page containing a hyperlink with the contact-request URL as a destination of the hyperlink.

5. The apparatus of claim 1, the web server part of a social-networking service, the web component operative to receive a social-networking friends web page from the web server, the social-networking friends web page comprising a listing of potential friends on the social-networking service identified based on the plurality of contacts.

6. A computer-implemented method, comprising:

transmitting a web request to the web server, the web request comprising a notification to the web server that a device supports contact requests, the device supporting a web browser and a web component;

receiving a remote command indicating a contact request from the web server, the remote command comprising a contact-request uniform resource locator (URL) including a sequence of one or more characters indicating a contact request;

retrieving a plurality of contacts from a contacts storage on the device in response to the received remote command, the plurality of contacts retrieved through an application program interface (API) call performed by an application local to the contacts storage, the API invoked in response to receiving the contact-request URL from the web server; and transmitting the plurality of contacts to the web server, the web component configured to receive and respond to the remote request without knowledge of the web browser.

7. The method of claim 6, wherein the web browser comprises an application including web functionality provided by a library, the library also providing the web component.

8. The method of claim 6, the web browser whitelisted by the web server as authorized to handle contact requests.

9. The method of claim 6, the web component operative to receive a web page from the web server, the web page containing a hyperlink with the contact-request URL as a destination of the hyperlink.

10. The method of claim 6, the web server part of a social-networking service, the web component operative to receive a social-networking friends web page from the web server, the social-networking friends web page comprising a listing of potential friends on the social-networking service identified based on the plurality of contacts.

11. At least one non-transitory computer-readable storage medium storing:

instructions for transmitting a web request to the web server, the web request comprising a notification to the web server that a device supports contact requests, the device supporting a web browser and a web component;

instructions for receiving a remote command indicating a contact request from the web server, the remote command comprising a contact-request uniform resource locator (URL) including a sequence of one or more characters indicating a contact request;

instructions for retrieving a plurality of contacts from a contacts storage on the device in response to the received remote command, the plurality of contacts to be retrieved through an application program interface (API) call performed by an application local to the contacts storage, the API invoked in response to receiving the contact-request URL from the web server; and instructions for transmitting the plurality of contacts to the web server, the web component configured to receive and respond to the remote request without specific support from a provider of the web browser.

12. The non-transitory computer-readable-medium of claim 11, wherein the web browser comprises an application including web functionality provided by a library, the library also providing the web component.

13. The non-transitory computer-readable-medium of claim 11, the web browser whitelisted by the web server as authorized to handle contact requests.

14. The non-transitory computer-readable-medium of claim 11, the web server part of a social-networking service, the web component operative to receive a social-networking friends web page from the web server, the social-networking friends web page comprising a listing of potential friends on the social-networking service identified based on the plurality of contacts.

* * * * *